United States Patent
Goodson et al.

(10) Patent No.: US 9,553,818 B2
(45) Date of Patent: Jan. 24, 2017

(54) LINK BIASED DATA TRANSMISSION

(71) Applicant: ADTRAN Inc., Huntsville, AL (US)

(72) Inventors: Richard Lee Goodson, Huntsville, AL (US); Kenneth David Ko, Clearwater, FL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 14/537,985

(22) Filed: Nov. 11, 2014

(65) Prior Publication Data

US 2015/0381508 A1    Dec. 31, 2015

Related U.S. Application Data

(60) Provisional application No. 62/017,861, filed on Jun. 27, 2014.

(51) Int. Cl.
*H04L 12/805* (2013.01)
*H04L 12/891* (2013.01)
*H04L 12/729* (2013.01)

(52) U.S. Cl.
CPC ............ *H04L 47/36* (2013.01); *H04L 45/125* (2013.01); *H04L 47/41* (2013.01)

(58) Field of Classification Search
CPC .................................. H04L 47/36; H04L 47/41
See application file for complete search history.

(56) References Cited

U.S. PATENT DOCUMENTS

2012/0052900 A1* 3/2012 Liu .................... H04W 28/0205
                                                        455/515
2013/0132604 A1* 5/2013 Cohen ................. H04W 76/025
                                                        709/231

FOREIGN PATENT DOCUMENTS

EP        2704481        3/2014

OTHER PUBLICATIONS

International Search Report and Written Opinion of the International Searching Authority issued in International Application No. PCT/US2015/037695 on Aug. 19, 2015; 9 pages.

* cited by examiner

*Primary Examiner* — Jamal Javaid
(74) *Attorney, Agent, or Firm* — Fish & Richardson P.C.

(57) ABSTRACT

Methods, systems, and apparatus, including computer programs encoded on a computer storage medium, for implementing biased bonding. In one aspect, a method includes estimating an offered load. Data are transmitted over a first communications link of two or more different types of communications links while the estimated offered load is less than or equal to a specified amount. A determination is made that the estimated offered load has exceeded the specified amount. In response to the determination data are transmitted over both of the first communications link and a second communications link of the two or more different types of communications links in response to determining that the estimated offered load has exceeded the specified amount.

13 Claims, 5 Drawing Sheets

LINK BIASED DATA TRANSMISSION

CROSS-REFERENCE TO RELATED APPLICATIONS

This application claims the benefit under 35 U.S.C. §119 (e) of U.S. Patent Application No. 62/017,861, entitled "Systems and Methods for Link Based Bonding in a Frequency Division Vectoring System," filed on Jun. 27, 2014, which is incorporated herein by reference in its entirety.

BACKGROUND

This specification relates to data communications.

Telecommunications systems can use multiple different physical communications links (e.g., multiple sets of twisted pair wires, different spectrum bands, or other communications links) to create a single logical link that provides higher bandwidth than the individual physical communications links. For example, Ethernet frames (or other frames of data) can be broken into fragments that are transmitted over the different physical communications links. At a receiver, the fragments can be recombined into the Ethernet frames (or other frames of data).

SUMMARY

In general, one innovative aspect of the subject matter described in this specification can be embodied in methods that include the actions of estimating an amount of load offered to be transmitted; transmitting data over a first communications link of two or more different types of communications links while the estimated offered load is less than or equal to a specified amount; determining that the estimated offered load exceeds the specified amount; and transmitting data over both of the first communications link and a second communications link of the two or more different types of communications links in response to determining that the estimated offered load has exceeded the specified amount. Other embodiments of this aspect include corresponding systems, apparatus, and programs, configured to perform the actions of the methods, encoded on data storage devices.

These and other embodiments can each optionally include one or more of the following features. Transmitting data over a first communications link can include transmitting data only over a set of one or more VDSL2 first channels while the estimated offered load is less than or equal to the specified amount.

Transmitting data over a first communications link can include transmitting data only over a set of one or more first channels while the estimated offered load is less than or equal to the specified amount.

Transmitting data over both of the first communications link and a second communications link can include transmitting data over both of the set of one or more first channels and a set of one or more second channels when the estimated offered load exceeds the specified amount.

Methods can further include the operations of determining that the estimated offered load has reduced to less than the specified amount; and halting transmissions of the data over the second communications link in response to determining that the estimated offered load has reduced to less than the specified amount.

Transmitting data over a first communications link can include transmitting data over a VDSL2 channel on a particular physical medium. Transmitting data over a G.fast communications link can include transmitting data over a second transmission channel on the particular physical medium.

Determining that the estimated offered load exceeds the specified amount can include determining that an ingress rate of data exceeds an egress rate at which data is able to be transmitted using the first communications link.

Methods can include the operations of determining an estimated offered load over the second communications link based on a difference between the estimated offered load and an amount of data that is able to be transmitted over the first communications link during a particular communications timing interval.

Transmitting data over the first communications link can include determining, for a first timing interval, that the estimated offered load is less than or equal to an amount of data that is able to be transmitted over the first communications link during the first timing interval; and transmitting data only over the first communications link in response to the determination that the estimated offered load is less than or equal to an amount of data that is able to be transmitted over the first communications link during the first timing interval.

Transmitting data over a first communications link can include transmitting data only over a G.fast channel while the estimated offered load is less than or equal to the specified amount. Transmitting data over both of the first communications link and a second communications link can include transmitting data over both of the G.fast channel and a VDSL2 channel when the estimated offered load exceeds the specified amount.

Particular embodiments of the subject matter described in this specification can be implemented so as to realize one or more of the following advantages. Peak data rates achieved using the techniques described in this document can be higher and/or provided with higher probability than those realized absent the use of the techniques described in this document. Limiting the use of a particular communications link (e.g., a G.fast channel) to situations where the data to be transmitted exceeds the maximum load capacity of another communications link (e.g., a VDSL2 channel) limits crosstalk that is generated through use of the particular communications channel.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
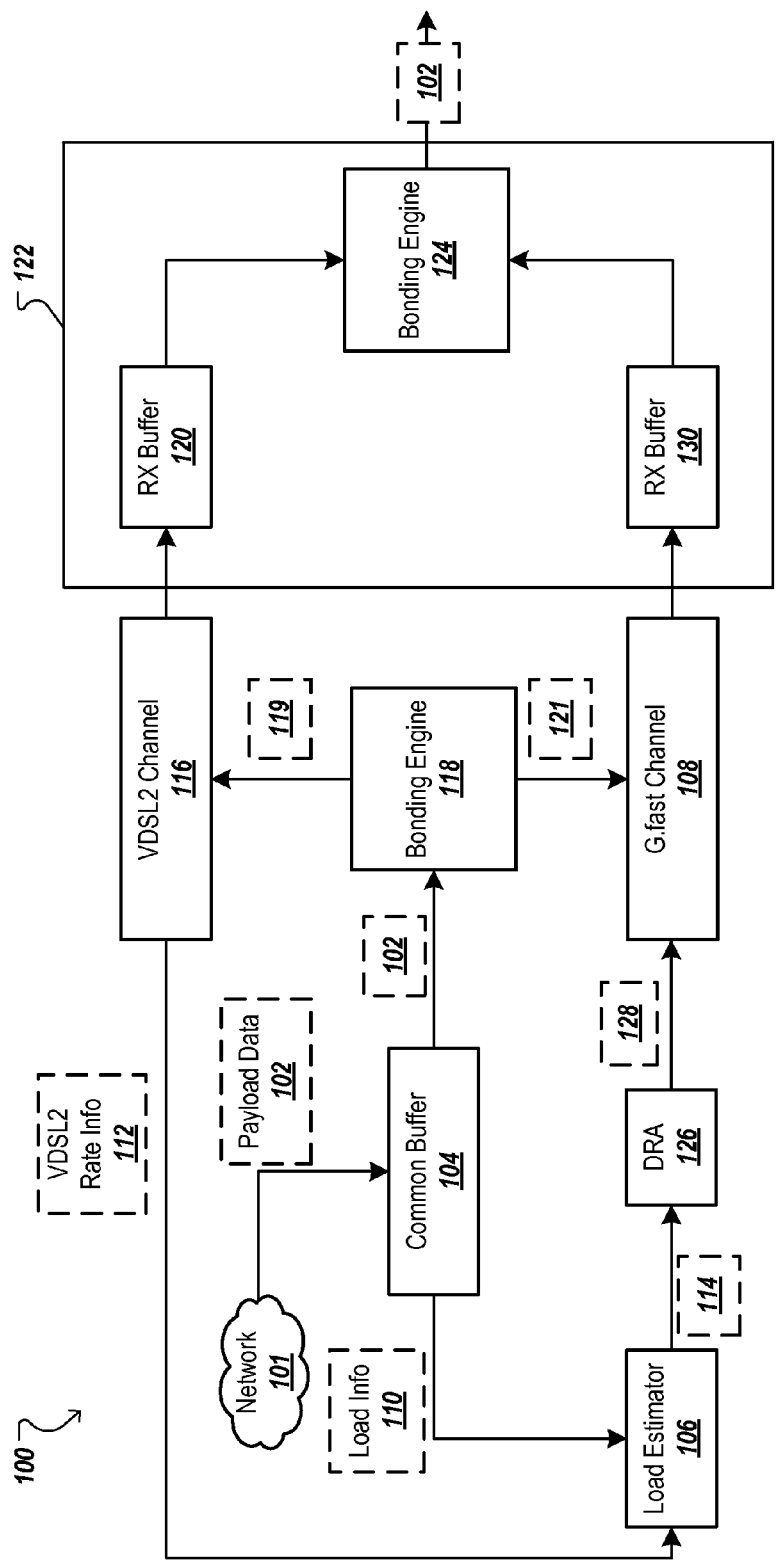
FIG. 1 is a block diagram of an example biased bonding architecture and example biased bonding data flow.

This document describes transmission of data over multiple different types of communications links that can communicate over single physical link or over multiple different physical links. The different types of communications links can have different maximum load capacities, which can vary depending on a distance over which signals are to be transmitted (e.g., a length of the physical medium). In some implementations, the communications links can include a VDSL2 channel and a G.fast channel that are both implemented on twisted pair conductors ("twisted pairs"). The combination of G.fast and VDSL2 (or Vectored VDSL2) on a single twisted pair is referred to as Frequency Division Vectoring, or FDV.

As discussed in more detail below, the data that are transmitted over each of the different types of communications links can be allocated in various different ways. For example, all data can be transmitted over a single communications link (e.g., only one of the VDSL2 channel or the G.fast channel) while the amount of data to be transmitted is less than or equal to the amount of data that can be transmitted over the single communications link during a specified time interval (e.g., a Dynamic Resource Allocation (DRA) interval). When the amount of data to be transmitted exceeds the amount of data that can be transmitted over the single communications link during the specified time interval, some of the data can be transmitted during the specified time interval using another communications link (e.g., one of the G.fast channel or the VDSL2 channel that was not initially used). In some implementations, data is only transmitted over the VDSL2 channel until the VDSL2 channel is completely occupied, which leaves the G.fast channel available for bursty "overflow" traffic that cannot be transmitted over the VDSL2 channel.

The descriptions throughout this document refer to VDSL2 channels and G.fast channels as two example communications links that can be used to transmit data. These descriptions are also applicable to various other types of communications links that transmit data. For example, the descriptions provided throughout this document can be used to transmit data over legacy communications links (e.g., operating in a first frequency range) and newer communications links (e.g., operating in a second frequency range) that are both deployed on a same physical medium.

The biased data transmission can also be applied in any communications system that has a set of (e.g., one or more) "fixed" rate communications channels and a set of "variable" rate (or shared) communications channels. In some implementations, the loads on the set of variable rate channels are minimized (or maintained below some specified amount) by utilizing the set of fixed rate communications channels until the full capacity of the fixed rate communications channels are utilized. For purposes of example, VDSL2 is used as an example fixed rate communications channel throughout this document, and G.fast is used as an example variable rate communications channel.

FIG. 1 is a block diagram of an example biased bonding architecture and example biased bonding data flow 100 (e.g., Layer 2 biased bonding). FIG. 1 is described with reference to a VDSL2 communications channel ("VDSL2 channel") and a G.fast communications channel ("G.fast channel"), but the description related to FIG. 1 is applicable to other systems that use other types of communications channels.

The data flow 100 can begin with payload data 102 being received for transmission. The payload data 102 can be received, for example, from a network 101 or from a communications device. The payload data 102 can be received, for example, by a common buffer 104 that stores data for transmission over any available communications channel.

As the payload data 102 are received, a load estimator 106 can estimate the amount of data offered for transmission (offered load) to a G.fast communications channel 108. To estimate the amount of load offered to the G.fast channel 108, the load estimator 106 can obtain (or access) load information 110 specifying a total amount of offered load as well as VDSL2 rate information 112 specifying a data rate at which a VDSL2 channel 116 is currently operating. Using this information, the load estimator 106 can determine a maximum amount of data that can be transmitted over the VDSL2 channel 116 (e.g., during a specified interval) and subtract that maximum amount of data from the total amount of offered load. The load estimator 106 outputs a G.fast offered load estimate 114 based on the result.

For example, if the result of the subtraction is a negative number or zero, the G.fast offered load estimate 114 can be set to zero. In this example, the VDSL channel 116 will request data fragments 119 from the bonding engine 118 and transmit the data fragments to a receive buffer 120 at a CPE device 122, while the G.fast channel will not request data fragments from the bonding engine 118. In turn, a bonding engine 124 of the CPE device 122 reconstructs and outputs the payload data 102 using the data fragments.

If the result of the subtraction is a positive number (e.g., greater than a specified amount), the G.fast offered load estimate can be set to a positive value that is based on (and/or specifies) the result. In some implementations relationship (1) can be used by the load estimator 106 to determine the value of the G.fast load estimate 114.

$$L = \max(D - VI, 0) \quad (1)$$

where,
L is the G.fast offered load estimate;
D is the total offered load;
V is the current VDSL2 rate; and
I is a duration of the specified interval.

According to relationship (1), the G.fast offered load estimate will be zero until the difference between D and VI is a non-zero positive value. In some implementations, the total amount of offered load (D) (e.g., during a specified time interval) can be based on the amount of data that is stored in the buffer 104. For example, the total amount of data that needs to be transmitted can vary in proportion to an amount of payload data 102 that is stored in the buffer. In another example, the total amount of offered load can be based on an amount of payload data 102 received and/or rate of receipt of the payload data 102. For example, the total amount of offered load can increase in proportion to the amount of payload data 102 received or the rate of receipt of the payload data 102.

The G.fast offered load estimate 114 is provided (e.g., transmitted) to a G.fast dynamic resource allocation apparatus ("G.fast DRA") 126. The G.fast DRA 126 generates a G.fast transmission map 128 based on the G.fast load estimate 114. For example, when the G.fast load estimate 114 is a positive value, the G.fast DRA 116 can generate a transmission map that specifies time slots that are allocated to each transceiver in the G.fast channel 108, and provide the transmission map to the G.fast channel 108. In turn, the G.fast channel 108 requests data fragments 121 from the bonding engine 118 according to the G.fast transmission map 128, and transmits the data fragments to a receive buffer 130 of the CPE device 122. In turn, the bonding engine 124 reconstructs and outputs the payload data 102 using the data fragments.

Note that the amount of load carried by the combination of the VDSL2 and G.fast channels during a given transmission interval may not be the same as the amount of load offered to the system. If a large amount of data is offered, the G.fast DRA 126 may determine that there are not sufficient resources to carry it all. This is a normal condition. Conversely, due to a number of conditions (retransmissions, additional data arriving after the offered load has been estimated, etc.) the amount of data carried by the system in a given interval could actually be larger than the estimated offered load.

Figure 2:
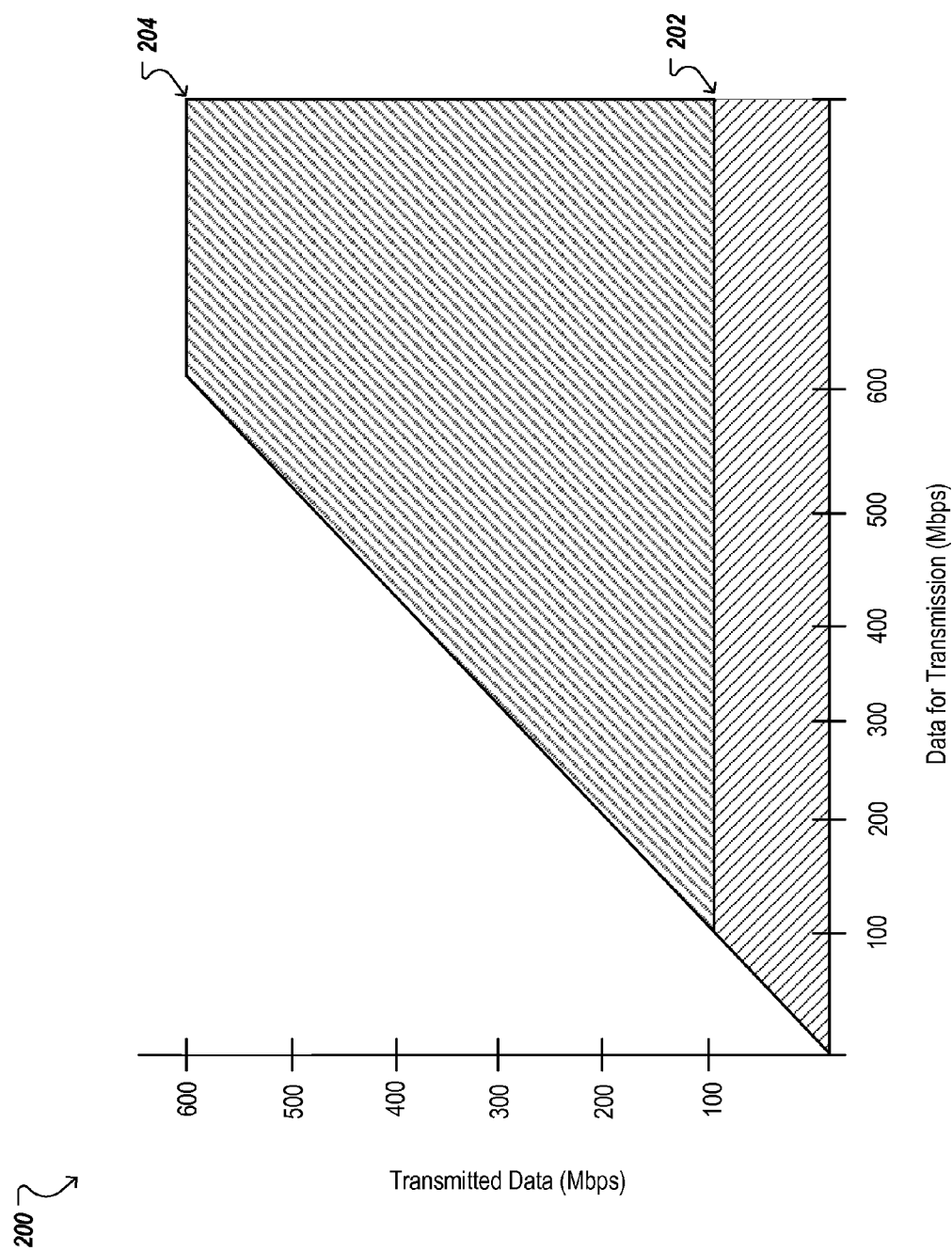
FIG. 2 is a graph illustrating an example data load that is carried using a biased bonding system.

FIG. 2 is a graph 200 illustrating an example data load that is carried using a biased bonding system similar to that discussed above with reference to FIG. 1. As illustrated by the graph 200, the VDSL2 channel carries the entire offered load (e.g., all of the data to be transmitted) until the offered load meets a load capacity of the VDSL2 channel 202 (e.g., 100 Mbps). When the offered load exceeds the load capacity of the VDSL2 channel, the G.fast channel carries the portion of the offered load that exceeds the load capacity of the VDSL2 channel until that portion meets the load capacity of the G.fast channel 204 (e.g., 500 Mbps).

In some implementations, a biased bonding architecture utilizes the G.fast channel first, and only uses the VDSL2 channel when the load capacity of the G.fast channel is met. In such implementations, the biased bonding architecture would operate in a similar manner as that described above, except that a load estimate for the VDSL2 channel (not the G.fast channel) would be used to determine whether data would be sent over the VDSL2 channel.

Figure 3:
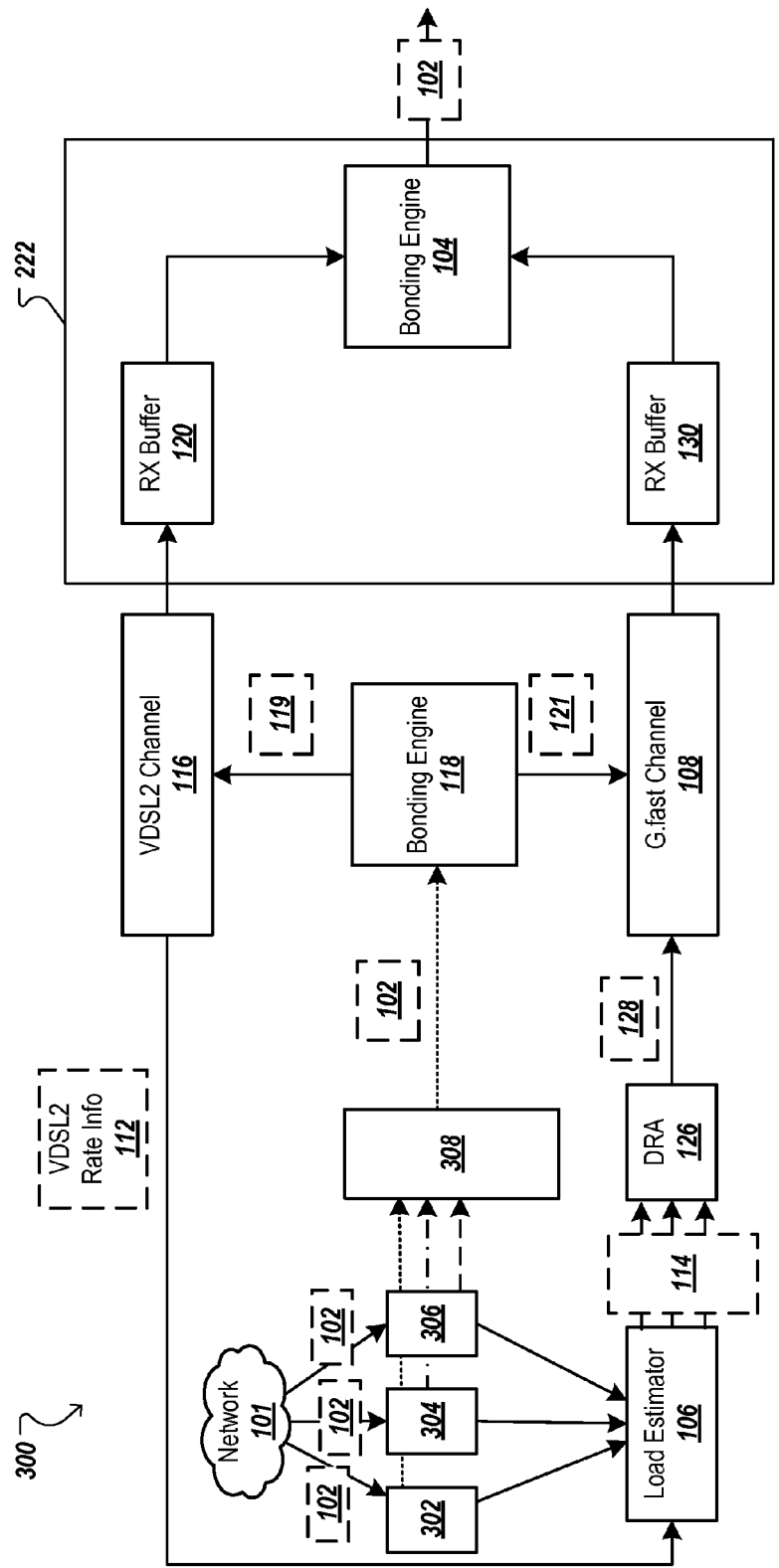
FIG. 3 is a block diagram of another example biased bonding architecture.

FIG. 3 is a block diagram of another example biased bonding architecture 300. The biased bonding architecture 300 is similar to that described above with reference to FIG. 1, but has three data queues 302, 304, and 306, instead of the common buffer 104, that store payload data 102 received from the network 110. In this example, each packet in the payload data 102 is classified into one of the three queues based on priority flags or other information associated with the packet. In the architecture 300, the G.fast load estimator 106 determines the G.fast load estimate 114 based on a total amount (e.g., sum) of data that is in each of the data queues 302, 304, and 306 (or being received through each of the data queues 302, 304, and 306) as specified by load information for the data queues 302, 304, and 306 and the current VDSL2 rate 112. The architecture 300 also includes a scheduler 308 that can schedule the data that will be provided to the bonding engine 118 (e.g., based on priority flags or other priority information associated with the data).

In some implementations, the G.fast load estimations 114 for the architecture 300 can be determined on a per priority basis. For example, at each priority level (e.g., in order from highest priority level to lowest priority level), all data at that priority level can be allocated to the VDSL2 channel until the load capacity of the VDSL2 channel is reached. Once the load capacity of the VDSL2 channel is reached, additional data in that priority level and data at lower priority levels will be allocated to the G.fast channel, such that the G.fast load estimation 114 will correspond to the amount of additional data and the amount of data at lower priority levels that remain. In some implementations, the G.fast load estimation 114 for each data priority level can be determined as follows:

Set $C_{P_{max}}=VI$ to initialize the VDSL2 load capacity;
For $p=P_{max}$ to 0:

$L_p=\max(D_p-C_p,0)$ $V_p=\min(D_p-L_p,C)$ $C_{p-1}=\max(C_p-V_p,0)$

Next p
where,
p=0–Pmax represents a queue's priority;
$C_p$ is the VDSL2 load capacity for priority p;
$L_p$ is the G.fast offered load for priority p;
$V_p$ is the VDSL2 offered load for priority p;
V is the current VDSL2 rate;
I is a duration of the specified interval; and
$D_p$ is the amount of load offered from queue p.

Other operations and data flow depicted in FIG. 3 are similar to those discussed above with reference to FIG. 1. For purposes of brevity, that description will not be repeated here.

Figure 4:
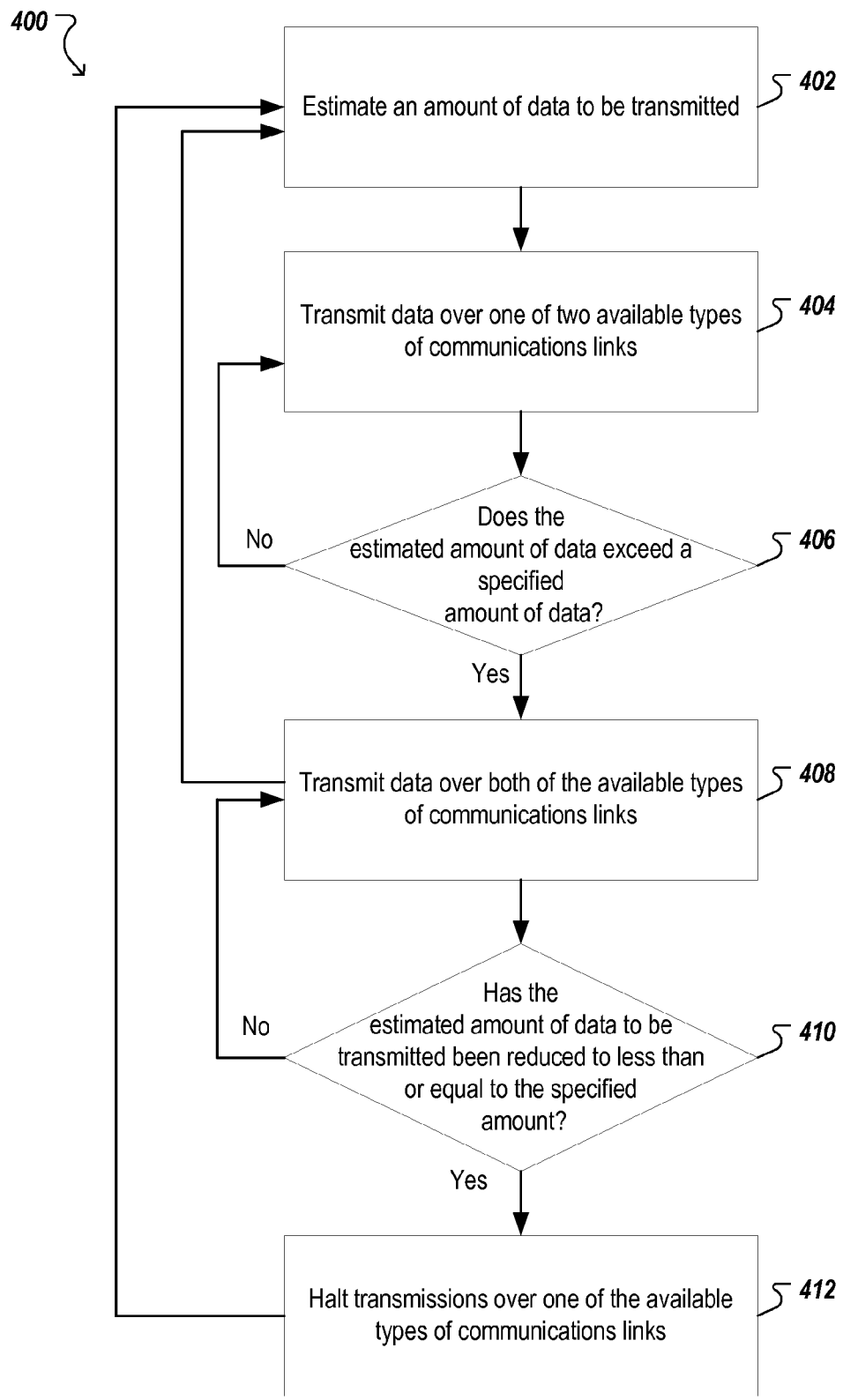
FIG. 4 is a block diagram of an example process for implementing biased bonding.

FIG. 4 is a block diagram of an example process 400 for implementing biased bonding. The process 400 can be implemented, for example, by one or more processing apparatus or processing components, such as components discussed above with reference to FIG. 1. The process 400 can also be implemented as instructions stored on a computer readable medium, where execution of the instructions by one or more data processing apparatus cause the one or more data processing apparatus to perform operations of the process 400.

An amount of offered load is estimated (402). In some implementations, the offered load can be estimated based on an amount of data that is stored in a data buffer and/or an ingress rate of data to be transmitted. For example, with reference to FIG. 1, the offered load can be estimated based on an amount of data included in the common buffer 104 and/or the rate at which data is being received into the common buffer 104. The offered load can be periodically estimated for each transmission interval (e.g., each Dynamic Resource Allocation (DRA) interval). For example, the load offered in a given DRA interval can be determined based on the amount of data that is stored in a data buffer at a beginning of the given DRA interval and/or an ingress rate of data to be transmitted during the DRA interval.

Data are transmitted over one or both of two available types of communications links (404). In some implementations, data are transmitted only over one of the two available types of communications links when the offered load is less than or equal to a specified amount (406). For example, for a given time interval (e.g., "first time interval"), a determination can be made that the estimated offered load is less than or equal to an amount of data that is able to be transmitted over one of the two available types of communications links during the given timing interval. In response to this determination, data can be transmitted over only one of the communications links during the given time interval, which will leave the other communications link available for overflow data and/or bursty data that are received during the given time interval.

Assume, for purposes of illustration, that one of the available types of communications links is a VDSL2 channel, and that the other available type of communication link is a G.fast channel. In this example, if the estimated offered load during a given time interval is less than or equal to 100 Mbps, then the offered load is less than or equal to the maximum amount of data that are able to be transmitted by the VDSL2 channel. Thus, the data could be transmitted over either one of the communications links without using the other communications link.

In some implementations, the data are transmitted over the VDSL2 channel while the estimated offered load during a given time interval is less than or equal to a specified amount. For example, when the estimated offered load is less than or equal to the maximum amount of data that is able to be transmitted over the VDSL2 channel during a given time interval, all of the data can be transmitted over the VDSL2 channel during that given time interval.

In some alternative implementations, the data are transmitted over the G.fast channel while the amount of data to be transmitted is less than or equal to the specified amount. For example, the specified amount can be set to the maximum amount of data that is able to be transmitted over the G.fast channel over a given time interval. In this example, the data can be transmitted over the G.fast channel while the estimated amount of data to be transmitted is less than or equal to the maximum amount of data that is able to be transmitted over the G.fast channel.

A determination is made whether the estimated offered load has exceeded a specified amount (406). The determination can be made, for example, by comparing the estimated offered load during a given time interval to the specified amount to determine whether the specified amount has been exceeded. For example, assume that the specified amount is set to the maximum amount of data that can be transmitted over the VDSL2 channel in a given interval. In this example, the determination can be made by comparing the estimated offered load over the given interval to the maximum amount of data that can be transmitted over the VDSL2 channel during the given interval. If the estimated offered load exceeds the maximum amount of data that can be transmitted over the VDSL2 channel, then the outcome of this determination is positive ("Yes"). Otherwise, the outcome of the determination is negative ("No"). Other specified amounts can also be used for purposes of the determination.

In some implementations, determining the estimated offered load can include an evaluation of the ingress rate at which data is being received relative to an egress rate at which data is able to be transmitted over one of the communications links (e.g., the VDSL2 channel). For example, if the ingress rate exceeds the egress rate by at least a specified amount (or at all), the outcome of the determination can be positive ("Yes"), while the determination can be negative ("No") if the ingress rate does not exceed the egress rate. Alternatively, or additionally, the determination can be based on a combination of an amount of data that is currently in a data buffer and the ingress/egress rates.

In response to determining that the estimated amount of data to be transmitted has not exceeded the specified amount, data can be transmitted over only one of the two available types of communications links (404), and the load estimation (402) and determination (406) can be iteratively performed.

In response to determining that the estimated amount of data to be transmitted has exceeded the specified amount data are transmitted over both of the two available types of communications links (408). In some implementations, transmitting data over both of the two available types of communications links includes transmitting data over both a VDSL2 channel and a G.fast channel. For example, as discussed above, one of the VDSL2 and/or G.fast channels can be used individually to transmit data until the estimated amount of data reaches the specified amount, but when the estimated amount of data to be transmitted exceeds the specified amount data can also be transmitted on the other available channel.

In some implementations, the amount of data to be offered to one of the communications links (e.g., the "second communications link") can be determined based on a difference between the estimated offered load and an amount of data that is able to be transmitted over the other communications link (e.g., the first communications link) Continuing with the example where the VDSL2 channel is first used to transmit data (e.g., until the estimated offered load reaches or exceeds the maximum amount of data that is able to be transmitted using the VDSL2 channel), the load offered to the G.fast channel can be the difference between the estimated offered load and the amount of data that is able to be transmitted over the VDSL2 channel, which can be determined using relationship (1) above.

In some implementations, both of the two available types of communications links communicate over a same physical medium (e.g., twisted conductor pair). For example, a VDSL2 channel and G.fast channel can both be used transmit signals over the same twisted conductor pair. Thus, when both of the VDSL2 channel and the G.fast channel are being used to simultaneously transmit data, the data transmitted using both of these channels will be transmitted over the same twisted conductor pair.

In some implementations, subsequent to the operation 408, the process 400 can return to iteratively perform the operations 402, 404, 406, and/or 408. In some implementations, an optional determination can be made whether the estimated amount of data to be transmitted has been reduced to less than the specified amount (410). For example, for a subsequent time interval (e.g., relative to the given time interval above), a determination can be made whether transmitting data over both of the two available types of communications links has reduced the offered load to less than the specified amount. When the outcome of the determination is negative ("No"), data can optionally continue to be transmitted over both of the available types of communications links (408) for the subsequent time interval. When the outcome of the determination is positive ("Yes"), transmissions over one of the communications links (e.g., the second communications link) can optionally be halted in response to the determination (412).

Figure 5:
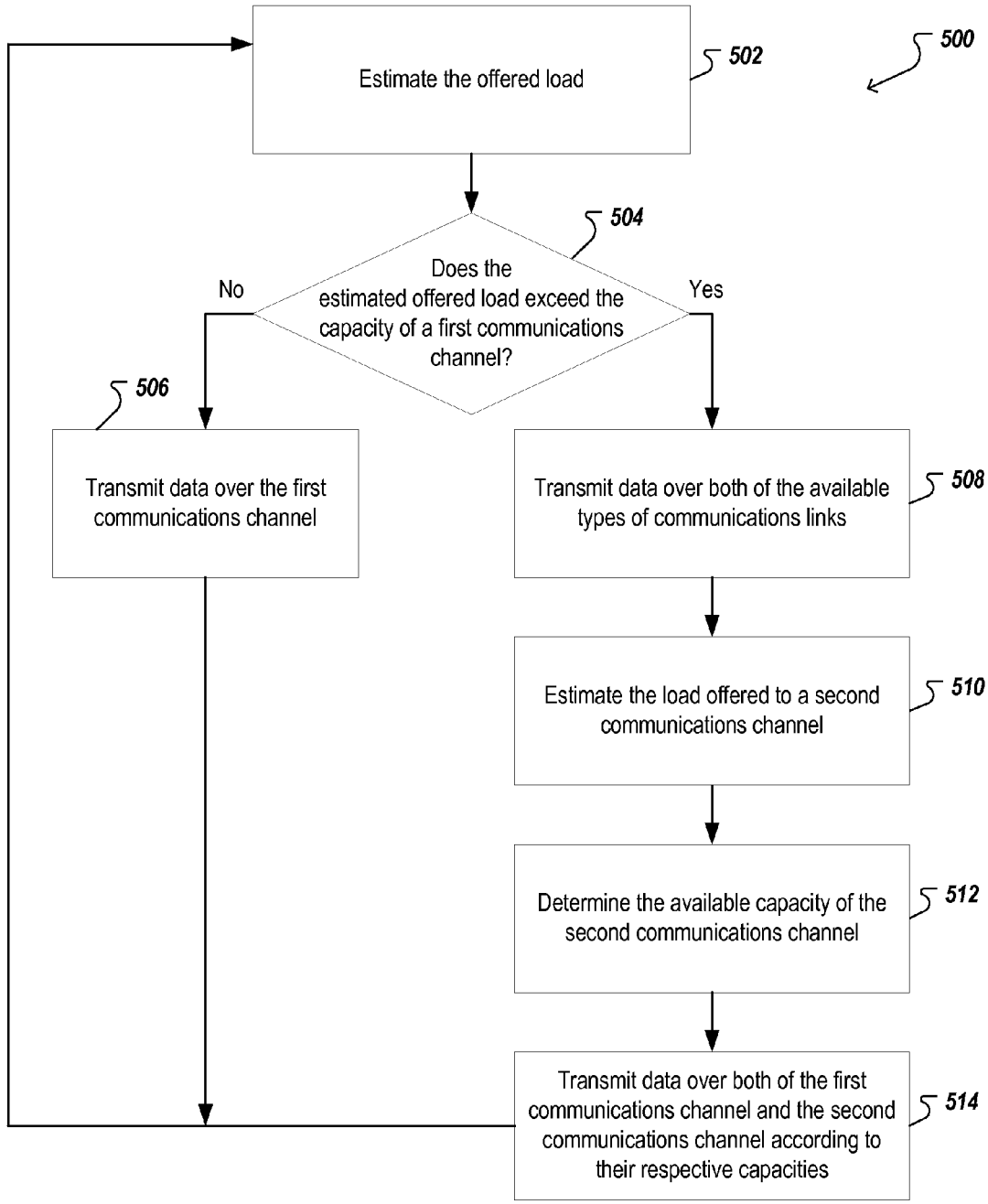
FIG. 5 is another example process for implementing biased bonding.

FIG. 5 is another example process for implementing biased bonding. The process 500 can be implemented, for example, by one or more processing apparatus or processing components, such as components discussed above with reference to FIG. 1. The process 500 can also be implemented as instructions stored on a computer readable medium, where execution of the instructions by one or more data processing apparatus cause the one or more data processing apparatus to perform operations of the process 500.

An amount of offered load is estimated (502). In some implementations, the offered load can be estimated based on an amount of data that is stored in a data buffer and/or an ingress rate of data to be transmitted. For example, with reference to FIG. 1, the offered load can be estimated based on an amount of data included in the common buffer 104 and/or the rate at which data is being received into the common buffer 104. The offered load can be periodically estimated for each transmission interval (e.g., each Dynamic Resource Allocation (DRA) interval). For example, the load offered in a given DRA interval can be determined based on the amount of data that is stored in a data buffer at a beginning of the given DRA interval and/or an ingress rate of data to be transmitted during the DRA interval.

A determination is made whether the estimated offered load has exceeded the capacity of a first communications channel (504). The determination can be made, for example, by comparing the estimated offered load during a given time interval to the capacity of the first communications channel to determine whether the capacity has been exceeded. For example, assume that the capacity is the maximum amount of data that can be transmitted over the VDSL2 channel in a given interval. In this example, the determination can be made by comparing the estimated offered load over the given interval to the maximum amount of data that can be transmitted over the VDSL2 channel during the given interval. If the estimated offered load exceeds the maximum amount of data that can be transmitted over the VDSL2 channel, then the outcome of this determination is positive ("Yes"). Otherwise, the outcome of the determination is negative ("No").

In response to determining that the capacity of the first communications channel has not been exceeded, data can be transmitted over only the first communications channel (506), and the load estimation (502) and determination (504) can be iteratively performed.

In response to determining that the offered load has exceeded the capacity of the first communications channel, the amount of load offered to a second communications channel is estimated (508). The amount of load offered to the second communications channel may be estimated, for example, by subtracting the capacity of the first communications channel from the total amount of estimated offered load (502).

The load offered to the second communications channel (508) is used along with other criteria to determine the amount of capacity available to transmit the offered load over the second communications channel (510). The other criteria may include, for example, the loads offered to communications channels that are coupled with the second communications channel and that affect (e.g., reduce) the second communications channel's available capacity.

Once the available capacity (510) on the second communications channel is determined, data are transmitted over both of the first communications channel and the second communications channel (512). In some implementations, transmitting data over both of the communications channels includes transmitting data over both a VDSL2 channel and a G.fast channel. For example, as discussed above, one of the VDSL2 and/or G.fast channels can be used individually to transmit data until the estimated amount of data reaches the specified amount, but when the estimated amount of data to be transmitted exceeds the specified amount data can also be transmitted on the other available channel. The load estimation (502) and determination (504) can be iteratively performed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented, at least in part, as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magnetooptical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
   estimating an amount of load offered to be transmitted;
   transmitting data over a first communications link of two or more different types of communications links while the estimated offered load is less than or equal to a specified amount, wherein transmitting data over the first communications link comprises transmitting data only over a set of one or more first channels while the estimated offered load is less than or equal to the specified amount;
   determining that the estimated offered load exceeds the specified amount;
   transmitting data over both of the first communications link and a second communications link of the two or more different types of communications links in response to determining that the estimated offered load has exceeded the specified amount, wherein transmitting data over both of the first communications link and the second communications link comprises transmitting data over both of the set of one or more first channels and a set of one or more second channels when the estimated offered load exceeds the specified amount;
   determining that the estimated offered load has reduced to less than the specified amount; and
   halting transmissions of the data over the second communications link in response to determining that the estimated offered load has reduced to less than the specified amount.

2. A method performed by one or more data processing apparatus, the method comprising:
   estimating an amount of load offered to be transmitted;
   transmitting data over a first communications link of two or more different types of communications links while the estimated offered load is less than or equal to a specified amount, wherein transmitting data over the first communications link comprises transmitting data over a VDSL2 channel on a particular physical medium;
   determining that the estimated offered load exceeds the specified amount; and
   transmitting data over both of the first communications link and a second communications link of the two or more different types of communications links in response to determining that the estimated offered load has exceeded the specified amount, wherein transmitting data over the second communications link comprises transmitting data over a G.fast channel on the particular physical medium.

3. A method performed by one or more data processing apparatus, the method comprising:
   estimating an amount of load offered to be transmitted;
   transmitting data over a first communications link of two or more different types of communications links while the estimated offered load is less than or equal to a specified amount;
   determining that the estimated offered load exceeds the specified amount, wherein determining that the estimated offered load exceeds the specified amount comprises determining that an ingress rate of data exceeds an egress rate at which data is able to be transmitted using the first communications link;
   determining an estimated offered load over a second communications link based on a difference between the estimated offered load and an amount of data that is able to be transmitted over the first communications link during a particular communications timing interval; and
   transmitting data over both of the first communications link and the second communications link of the two or more different types of communications links in response to determining that the estimated offered load has exceeded the specified amount.

4. A method performed by one or more data processing apparatus, the method comprising:
   estimating an amount of load offered to be transmitted;
   transmitting data over a first communications link of two or more different types of communications links while the estimated offered load is less than or equal to a specified amount, wherein transmitting data over the first communications link comprises:
     determining, for a first timing interval, that the estimated offered load is less than or equal to an amount of data that is able to be transmitted over the first communications link during the first timing interval; and
     transmitting data only over the first communications link in response to the determination that the estimated offered load is less than or equal to an amount of data that is able to be transmitted over the first communications link during the first timing interval;

determining that the estimated offered load exceeds the specified amount; and transmitting data over both of the first communications link and a second communications link of the two or more different types of communications links in response to determining that the estimated offered load has exceeded the specified amount.

5. A method performed by one or more data processing apparatus, the method comprising:

estimating an amount of load offered to be transmitted;

transmitting data over a first communications link of two or more different types of communications links while the estimated offered load is less than or equal to a specified amount, wherein transmitting data over the first communications link comprises transmitting data only over a G.fast channel while the estimated offered load is less than or equal to the specified amount;

determining that the estimated offered load exceeds the specified amount; and transmitting data over both of the first communications link and a second communications link of the two or more different types of communications links in response to determining that the estimated offered load has exceeded the specified amount, wherein transmitting data over both of the first communications link and the second communications link comprises transmitting data over both of the G.fast channel and a VDSL2 channel when the estimated offered load exceeds the specified amount.

6. A computer storage medium encoded with a computer program, the program comprising instructions that when executed by one or more data processing apparatus cause the one or more data processing apparatus to perform operations comprising:

estimating an amount of load offered to be transmitted;

transmitting data over a first communications link of two or more different types of communications links while the estimated offered load is less than or equal to a specified amount, wherein transmitting data over the first communications link comprises transmitting data only over a set of one or more first channels while the estimated offered load is less than or equal to the specified amount;

determining that the estimated offered load exceeds the specified amount;

transmitting data over both of the first communications link and a second communications link of the two or more different types of communications links in response to determining that the estimated offered load has exceeded the specified amount, wherein transmitting data over both of the first communications link and the second communications link comprises transmitting data over both of the set of one or more first channels and a set of one or more second channels when the estimated offered load exceeds the specified amount;

determining that the estimated offered load has reduced to less than the specified amount; and halting transmissions of the data over the second communications link in response to determining that the estimated offered load has reduced to less than the specified amount.

7. A computer storage medium encoded with a computer program, the program comprising instructions that when executed by one or more data processing apparatus cause the one or more data processing apparatus to perform operations comprising:

estimating an amount of load offered to be transmitted;

transmitting data over a first communications link of two or more different types of communications links while the estimated offered load is less than or equal to a specified amount, wherein transmitting data over the first communications link comprises transmitting data over a VDSL2 channel on a particular physical medium;

determining that the estimated offered load exceeds the specified amount; and transmitting data over both of the first communications link and a second communications link of the two or more different types of communications links in response to determining that the estimated offered load has exceeded the specified amount, wherein transmitting data over the second communications link comprises transmitting data over a G.fast channel on the particular physical medium.

8. A computer storage medium encoded with a computer program, the program comprising instructions that when executed by one or more data processing apparatus cause the one or more data processing apparatus to perform operations comprising:

estimating an amount of load offered to be transmitted;

transmitting data over a first communications link of two or more different types of communications links while the estimated offered load is less than or equal to a specified amount;

determining that the estimated offered load exceeds the specified amount, wherein determining that the estimated offered load exceeds the specified amount comprises determining that an ingress rate of data exceeds an egress rate at which data is able to be transmitted using the first communications link;

determining an estimated offered load over a second communications link based on a difference between the estimated offered load and an amount of data that is able to be transmitted over the first communications link during a particular communications timing interval; and transmitting data over both of the first communications link and the second communications link of the two or more different types of communications links in response to determining that the estimated offered load has exceeded the specified amount.

9. A computer storage medium encoded with a computer program, the program comprising instructions that when executed by one or more data processing apparatus cause the one or more data processing apparatus to perform operations comprising:

estimating an amount of load offered to be transmitted;

transmitting data over a first communications link of two or more different types of communications links while the estimated offered load is less than or equal to a specified amount, wherein transmitting data over the first communications link comprises:

determining, for a first timing interval, that the estimated offered load is less than or equal to an amount of data that is able to be transmitted over the first communications link during the first timing interval; and transmitting data only over the first communications link in response to the determination that the estimated offered load is less than or equal to an amount of data that is able to be transmitted over the first communications link during the first timing interval;

determining that the estimated offered load exceeds the specified amount; and transmitting data over both of the first communications link and a second communications link of the two or more different types of communications links in response to determining that the estimated offered load has exceeded the specified amount.

10. A computer storage medium encoded with a computer program, the program comprising instructions that when executed by one or more data processing apparatus cause the one or more data processing apparatus to perform operations comprising:

estimating an amount of load offered to be transmitted;

transmitting data over a first communications link of two or more different types of communications links while the estimated offered load is less than or equal to a specified amount, wherein transmitting data over the first communications link comprises transmitting data only over a G.fast channel while the estimated offered load is less than or equal to the specified amount;

determining that the estimated offered load exceeds the specified amount; and transmitting data over both of the first communications link and a second communications link of the two or more different types of communications links in response to determining that the estimated offered load has exceeded the specified amount, wherein transmitting data over both of the first communications link and the second communications link comprises transmitting data over both of the G.fast channel and a VDSL2 channel when the estimated offered load exceeds the specified amount.

11. A system comprising:

a load estimator that estimates an offered load over two different types of communications channels; and a bonding engine connected to the two different types of communications channels, wherein the bonding engine transmits data over only a first communications channel when the estimated offered load is less than or equal to a specified amount and transmits data over both of the first communications channel and a second communications channel of a different type when the estimated offered load exceeds the specified amount, wherein the bonding engine transmits data only over a set of one or more first channels while the estimated offered load is less than or equal to the specified amount, the bonding engine transmits data over both of the set of one or more first channels and a set of one or more second channels when the estimated offered load exceeds the specified amount, and the bonding engine further determines that the estimated offered load has reduced to less than the specified amount and halts transmission of the data over the second set of one or more communications channels in response to the determination that the estimated offered load has reduced to less than the specified amount.

12. A system comprising:

a load estimator that estimates an offered load over two different types of communications channels; and a bonding engine connected to the two different types of communications channels, wherein the bonding engine transmits data over only a first communications channel when the estimated offered load is less than or equal to a specified amount and transmits data over both of the first communications channel and a second communications channel of a different type when the estimated offered load exceeds the specified amount, wherein the first communications channel comprises a VDSL2 channel on a particular physical medium and the second communications channel comprises a G.fast channel on the particular physical medium.

13. A system comprising:

a load estimator that estimates an offered load over two different types of communications channels, wherein the load estimator determines an estimated offered load over the second communications channel based on a difference between the estimated offered load and an amount of data that is able to be transmitted over the first communications channel; and a bonding engine connected to the two different types of communications channels, wherein the bonding engine transmits data over only a first communications channel when the estimated offered load is less than or equal to a specified amount and transmits data over both of the first communications channel and a second communications channel of a different type when the estimated offered load exceeds the specified amount, wherein the estimated offered load is determined to meet or exceed the specified amount based on a determination that an ingress rate of data exceeds an egress rate at which data is able to be transmitted using the first communications channel.

* * * * *